United States Patent Office.

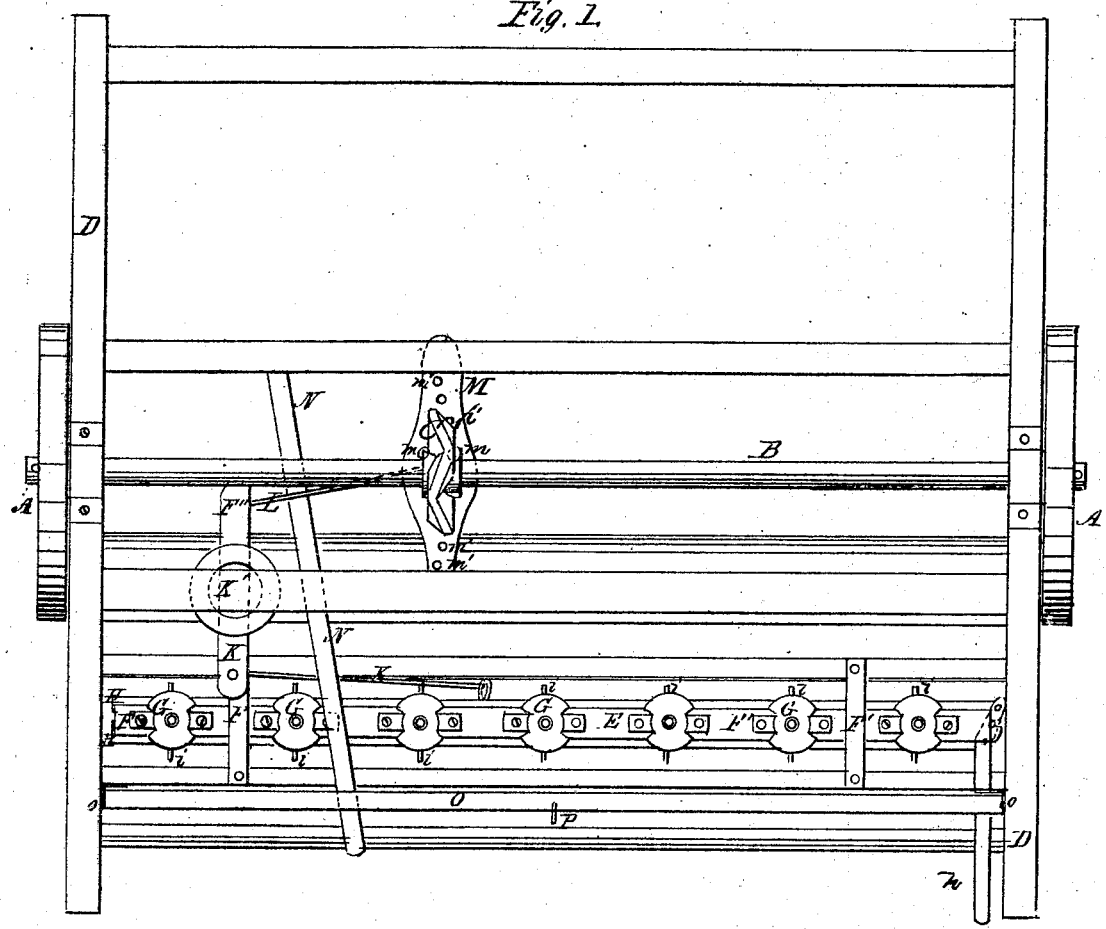
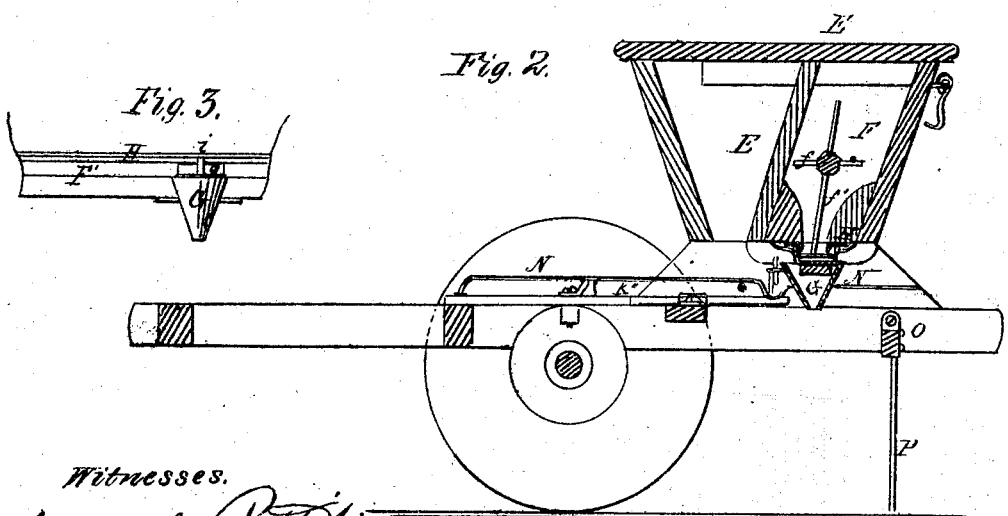

JOHN FRANKLIN THOMAS, OF ADAMSTOWN, MARYLAND.

Letters Patent No. 74,448, dated February 11, 1868.

IMPROVED MACHINE FOR DISTRIBUTING GUANO, &c.

*The Schedule referred to in these Letters Patent and making part of the same.*

TO ALL WHOM IT MAY CONCERN:

Be it known that I, JOHN FRANKLIN THOMAS, of Adamstown, in the county of Frederick, and State of Maryland, have invented a new and improved Machine for Distributing Guano and other Manures; and I do hereby declare the following to be a full, clear, and exact description of the same, sufficient to enable one skilled in the art to which the invention appertains to make use of it, reference being had to the accompanying drawings, which form a part of this specification, in which—

Figure 1 is a bottom view of my invention.

Figure 2 is a longitudinal vertical section of the same.

Figure 3 shows a part of the feed-box.

In this invention the escape of the fertilizer from the feed-box is adjusted by a couple of parallel-rule slides, and the agitating-apparatus is thrown into or out of gear by a novel and simple arrangement.

In the drawings, A A represent the wheels, working on an axle, B, which carries a cam-wheel, C, near its centre. D D are parts of the frame, and E is the feed-box. F represents the agitator, a pole, having pins $f f$ projecting from it and extending from one end of the feed-box to the other. This pole F is attached by the pins or arms $f' f'$ to the bottom, F', of the feed-box, which slides longitudinally with the pole F, pins $f f$ and $f' f'$, and bottom, F', thus forming the agitating-apparatus. The bottom, F', is situated slightly below the feed-box, and independent of it, sliding back and forth in sockets in short beams F'' F'', attached to the lower edges of the sides of the feed-box. It is composed of a bar of wood, bearing on its upper surface a metallic plate, the sides of which project slightly beyond the bar, and are turned up, forming raised lips or edges along each side of the whole length of the bottom, F'. Apertures $g g g$ are cut at suitable distances through these raised edges, and by means of these apertures the fertilizer is discharged from the feed-box, falling through funnels G G to the ground. Rods $i i i$ run through these apertures, being attached to the sides of the feed-box at its bottom, and being fixed in position.

Above the movable bottom, F', thus formed, are two strips H H, running longitudinally with the bottom, F', a little on each side of its centre, and connected together by parallel-ruler joints. An arm, $h$, operates them, opening or shutting them at pleasure. When shut, they shut off the supply of guano from the feed-box, nearly or quite closing it. When opened, they admit the fertilizer to pass freely from the feed-box through the apertures $g g g$ and the funnels G G to the ground.

The agitating-apparatus heretofore described is operated by a rod, $k$, which hooks into the movable bottom, F', and extends to the lever K. The latter pivots at its centre, and works on a friction-wheel, $k'$. At its opposite end it has a short post, $k''$, which is provided with a slot, into which drops the arm L, catching and working the lever K by means of a notch in its under surface. The arm L is attached to another arm or lever M, which is pivoted at its forward extremity so as to vibrate laterally, and has two vertical bolts $m m$ in its under side, provided with friction-rollers, and fitting closely to each side of the cam-wheel C. Apertures $m' m' m'$ are provided in the arm M, by means of which the arm L may be attached to it at different points, so as to regulate the vibrations of the movable bottom, F', of the feed-box.

N is a rod, hinged to a cross-beam of the frame D D, and passing under the arm L, its rear end resting on the upper side of a shaft, O, which works eccentrically upon hinges or bearings $o o$. P is a rod firmly fixed to the shaft O, by which the latter may be raised or lowered. A loop, $p$, is provided, to which to attach the rod P, in order to keep the shaft O elevated for any length of time desired. The rod N, it is evident, will be raised or lowered as the shaft O is turned one way or the other, and as it is raised it will throw the rod L out of the slot in the post $k''$, and cause the agitator to cease its motion. Instead of the rod L and arm M, I may prefer to operate the lever K directly by the cam-wheel C.

Having described my invention, what I claim as new, and desire to secure by Letters Patent, is—

1. The agitating-apparatus above described, consisting of pole F, pins $f f f' f'$, and movable bottom F', substantially as described.

2. The combination of the agitating-apparatus with the rod $k$, lever K, arm L, arm or lever M, and cam-wheel C, substantially as herein set forth.

3. The combination of the arm L with the rod N, eccentric-shaft O, and rod P, substantially as herein shown and described.

To the above specification of my improvement I have signed my hand, this 29th day of May, 1867.

JOHN FRANKLIN THOMAS.

Witnesses:
CHAS. A. PETTIT,
SOLON C. KEMON,